United States Patent
Haga

(10) Patent No.: US 10,501,649 B2
(45) Date of Patent: Dec. 10, 2019

(54) AQUEOUS INK COMPOSITION FOR WRITING INSTRUMENTS

(71) Applicant: MITSUBISHI PENCIL COMPANY, LIMITED, Shinagawa-ku, Tokyo (JP)

(72) Inventor: Hisato Haga, Yokohama (JP)

(73) Assignee: MITSUBISHI PENCIL COMPANY, LIMITED, Shinagawa-Ku, Tokyo (JP)

( * ) Notice: Subject to any disclaimer, the term of this patent is extended or adjusted under 35 U.S.C. 154(b) by 77 days.

(21) Appl. No.: 15/550,189

(22) PCT Filed: Feb. 18, 2016

(86) PCT No.: PCT/JP2016/054645
§ 371 (c)(1),
(2) Date: Aug. 10, 2017

(87) PCT Pub. No.: WO2016/133147
PCT Pub. Date: Aug. 25, 2016

(65) Prior Publication Data
US 2018/0016457 A1    Jan. 18, 2018

(30) Foreign Application Priority Data

Feb. 19, 2015   (JP) ................................ 2015-030457

(51) Int. Cl.
| | |
|---|---|
| *C09D 11/16* | (2014.01) |
| *B43K 5/00* | (2006.01) |
| *B43K 7/00* | (2006.01) |
| *B43K 8/00* | (2006.01) |
| *B43K 8/02* | (2006.01) |

(52) U.S. Cl.
CPC .............. *C09D 11/16* (2013.01); *B43K 5/00* (2013.01); *B43K 7/00* (2013.01); *B43K 8/00* (2013.01); *B43K 8/024* (2013.01)

(58) Field of Classification Search
None
See application file for complete search history.

(56) References Cited

U.S. PATENT DOCUMENTS

| | | | | |
|---|---|---|---|---|
| 8,133,314 B2 * | 3/2012 | Ishihara | ................. | C09D 11/38 106/31.86 |
| 8,778,072 B2 * | 7/2014 | Iseki | ...................... | C09D 11/38 106/31.58 |
| 2012/0162307 A1 * | 6/2012 | Yamazaki | ........... | C09D 11/322 106/31.89 |
| 2015/0022584 A1 * | 1/2015 | Yamazaki | ........... | C09D 11/322 347/29 |
| 2015/0376432 A1 * | 12/2015 | Van Zeeventer | .... | C09D 11/322 106/31.89 |

FOREIGN PATENT DOCUMENTS

| | | | |
|---|---|---|---|
| JP | H 05/271601 A | * | 10/1993 |
| JP | H 09/87566 A | * | 3/1997 |
| JP | 11-43637 A | | 2/1999 |
| JP | H11-217533 A | | 8/1999 |
| JP | 11-310742 A | | 11/1999 |
| JP | 2000-319570 A | | 11/2000 |
| JP | 2014-070208 A | | 4/2014 |

OTHER PUBLICATIONS

English translation of JPH 11/43637, Feb. 1999; 9 pages.*
English translation of JPH 11/217533, Aug. 1999; 16 pages.*
English translation of JP 2014/070208, Apr. 2014; 15 pages.*
English translation of JPH 09/87566, Mar. 1997; 9 pages.*
English translation of JPH 05/271601, Oct. 1993; 11 pages.*
Extended Search Report issued by the European Patent Office in corresponding European Patent Application No. 16752533.6-1014 dated Oct. 4, 2018 (7 pages).
PCT International Preliminary Report on Patentability (IPRP) and Written Opinion dated Aug. 31, 2017, in corresponding International Application No. PCT/JP2016/054645 (5 pages).
International Search Report (PCT/ISA/210) dated May 17, 2016, by the Japanese Patent Office as the International Searching Authority for International Application No. PCT/JP2016/054645.

* cited by examiner

*Primary Examiner* — Helene Klemanski

(74) *Attorney, Agent, or Firm* — Buchanan, Ingersoll & Rooney PC

(57) ABSTRACT

Provided is an aqueous ink composition for a writing instrument which is excellent in a drying property of drawn lines and a low temperature stability of the ink while inhibiting the pen tip from drying and which prevents the drawn lines from causing feathering and strike-through. The aqueous ink composition for a writing instrument described above contains at least a colorant, trimethylglycine, pentaerythritol, 10% by mass or less of a water-soluble organic solvent and water.

2 Claims, No Drawings

AQUEOUS INK COMPOSITION FOR WRITING INSTRUMENTS

TECHNICAL FIELD

The present invention relates to an aqueous ink composition for a writing instrument which is excellent in a drying property of the drawn lines and a low temperature stability of the ink while inhibiting the pen tip from drying and which prevents the drawn lines from causing feathering and strike-through.

BACKGROUND ART

Writing instruments containing an aqueous ink composition used to contain water, water soluble solvents and the like as a principal component, and therefore involved therein are the problems that when a long time passes while the pen tip part is left opened, a liquid component in the ink is vaporized to increase a viscosity of the ink and that the pen tip is dried to cause inferior writing.

A method for solving the above problems by adding glycols is usually known in a wide range, but it involves the defect that drying of the drawn lines is delayed.

An aqueous ink composition for solving the above problems by adding, for example, 1,4-cyclohexanedimethanol and lower alcohol is known (refer to, for example, a patent document 1).

However, it is the existing situation that in the technology shown in the patent document 1 described above, the ink is insufficient in a countermeasure for a stability at low temperature and brings about feathering and strike-through in the drawn lines and that a satisfactory effect is not obtained in drying of the drawn lines.

On the other hand, an aqueous ink containing at least a colorant, trimethylglycine (glycine betaine) and water is known as an ink which is excellent in a drought resistance of an ink discharge part such as a pen tip (refer to, for example, a patent document 2).

However, it involves the problem that in the technology shown in the patent document 2 described above, the ink is still insufficient in a drought resistance on the conditions of a high temperature and a high humidity and that a satisfactory effect is not obtained in drying of the drawn lines.

In particular, a wood free paper is used in increased cases for instructional books represented by textbooks in recent years. In general, the wood free paper has a property of being less liable to absorb water, and therefore the lines drawn on the paper are insufficiently dried to cause stain on the paper in certain cases. Also in the technologies shown in the patent documents 1 and 2 described above, involved therein are the problems that the lines drawn on the wood free paper are still insufficient in a drying property and that a drought resistance of the pen tip and a low temperature stability of the ink are unsatisfactory.

RELATED ART DOCUMENTS

Patent Documents

Patent document 1: JP-A 2000-319570 (claims, examples and the like)
Patent document 2: JP-A 1999-43637 (claims, examples and the like)

SUMMARY OF THE INVENTION

Problems to be Solved by the Invention

In light of the problems on the conventional technologies described above, the present invention tries to solve them, and an object thereof is to provide an aqueous ink composition for a writing instrument which is excellent in a drying property of the drawn lines and a low temperature stability of the ink while inhibiting the pen tip from drying and which prevents the drawn lines from causing feathering and strike-through.

In light of the conventional problems described above, intense researches repeated by the present inventors have resulted in finding that an aqueous ink composition for a writing instrument which meets the object described above is obtained by adding a colorant, trimethylglycine and water and controlling the ranges of the contents of a specific component and a water-soluble organic solvent to the specific values or lower. Thus, they have come to complete the present invention.

That is, the present invention resides in the following items (1) to (3).

(1) An aqueous ink composition for a writing instrument containing at least a colorant, trimethylglycine, pentaerythritol, 10% by mass or less of a water-soluble organic solvent, and water.
(2) The aqueous ink composition for a writing instrument as described in the above item (1), wherein the trimethylglycine is contained in an amount of 0.5 to 50% by mass based on a whole amount of the ink composition.
(3) The aqueous ink composition for a writing instrument as described in the above item (1) or (2), wherein the pentaerythritol is contained in an amount of 0.5 to 8% by mass based on a whole amount of the ink composition.
(4) A writing instrument charged with the aqueous ink composition for a writing instrument as described in any one of the above items (1) and (3).

According to the present invention, provided is an aqueous ink composition for a writing instrument which is excellent in a drying property of the drawn lines and a low temperature stability of the ink while inhibiting the pen tip from drying and which prevents the drawn lines from causing feathering and strike-through. In particular, provided is an aqueous ink composition for a writing instrument which provides the drawn lines with a satisfactory drying property even when used to write on a wood free paper used for instructional books represented by textbooks, which shows a drought resistance of the pen tip and a low temperature stability of the ink and which prevents the drawn lines from causing feathering and strike-through.

DESCRIPTION OF THE PREFERRED EMBODIMENTS

The embodiment of the present invention shall be explained below in detail.

The aqueous ink composition for a writing instrument according to the present invention is characterized by containing at least a colorant, trimethylglycine, pentaerythritol, 10% by mass or less of a water-soluble organic solvent, and water.

Dyes which are dissolved or dispersed in water, inorganic or organic pigments such as titanium oxide and the like which have so far been publicly known, resin particle pigments containing pigments, pseudo pigments obtained by coloring resin emulsions with dyes, fluorescent pigments, white plastic pigments, pigments comprising silica or mica as a base material and obtained by subjecting the surface layers thereof to multilayer coating with iron oxide and titanium oxide, and the like can be used as the colorant used in the present invention as long as the effects of the present invention are not damaged.

The dyes include, for example, acid dyes such as Eosin, Foxin, Water Yellow #6-C, Acid Red, Water Blue #105, Brilliant Blue FCF, Nigrosine NB and the like; direct dyes such as Direct Black 154, Direct Sky Blue 5B, Violet BOOB and the like; and basic dyes such as rhodamine, methyl violet and the like, and fluorescent dyes.

As for the organic pigments, for example, azo lakes, insoluble azo pigments, chelate azo pigments, phthalocyanine pigments, perylene and perinone pigments, nitroso pigments, and the like are included. To be more specific, the dyes include inorganic pigments such as carbon black, titan black, zinc oxide, red iron oxide, aluminum, chromium oxide, iron black, cobalt blue, yellow iron oxide, viridian, zinc sulfide, lithopone, cadmium yellow, vermilion, cadmium red, chrome yellow, molybdate orange, zinc chromate, strontium chromate, white carbon, clay, talc, ultramarine, precipitated barium sulfate, baryte powders, calcium carbonate, white lead, Prussian blue, manganese violet, aluminum powders, brass powders and the like, organic pigments such as C.I. Pigment Blue 15, C.I. Pigment Blue 17, C.I. Pigment Blue 27, C.I. Pigment Red 5, C.I. Pigment Red 22, C.I. Pigment Red 38, C.I. Pigment Red 48, C.I. Pigment Red 49, C.I. Pigment Red 53, C.I. Pigment Red 57, C.I. Pigment Red 81, C.I. Pigment Red 104, C.I. Pigment Red 146, C.I. Pigment Red 245, C.I. Pigment Yellow 1, C.I. Pigment Yellow 3, C.I. Pigment Yellow 12, C.I. Pigment Yellow 13, C.I. Pigment Yellow 14, C.I. Pigment Yellow 17, C.I. Pigment Yellow 34, C.I. Pigment Yellow 55, C.I. Pigment Yellow 74, C.I. Pigment Yellow 95, C.I. Pigment Yellow 166, C.I. Pigment Yellow 167, C.I. Pigment Orange 5, C.I. Pigment Orange 13, C.I. Pigment Orange 16, C.I. Pigment Violet 1, C.I. Pigment Violet 3, C.I. Pigment Violet 19, C.I. Pigment Violet 23, C.I. Pigment Violet 50, C.I. Pigment Green 7, and the like.

Pigments which have so far been publicly known can suitably be used as the fluorescent pigments and include, for example, inorganic fluorescent pigments such as zinc sulfide, zinc silicate, cadmium sulfide, strontium sulfide, calcium tungstate and the like, and organic fluorescent pigments obtained by coloring polymer compounds.

The organic fluorescent pigments include, to be specific, NKW series (manufactured by Nippon Fluorescent Chemical Co., Ltd.), Sinloihi Color Base SW series, SF series (manufactured by Sinloihi Co., Ltd.), Victoria series such as Victoria Yellow G-20 (manufactured by Mikuni Color Ltd.), and the like.

The above colorants can be used alone or in a mixture of two or more kinds thereof.

A content of the above colorants can suitably be controlled in a range of 0.1 to 60% by mass (hereinafter "% by mass" is referred to as merely "%") based on a whole amount of the ink composition.

Trimethylglycine (another name: glycine betaine, $(CH_3)_2 N^+(CH_3)CH_2COO^-$) used in the present invention is used in order to allow it to act as a moisturizer, and it does not bring about a reduction in the performances of the ink when it is blended with the aqueous ink composition for a writing instrument to exert a drought resistance of the pen tip, a drying property of the drawn lines and a low temperature stability of the ink.

A content of the above trimethylglycine is 0.5 to 50%, preferably 1 to 15% and more preferably 2 to 10% based on a whole amount of the ink composition.

If the above content is less than 0.5%, the drying inhibition effect of the pen tip is not sufficiently exerted, and on the other hand, if it exceeds 50%, the effect stays unchanged so much to rather bring about a reduction in the writing performance and the storage stability due to an increase in the viscosity.

Pentaerythritol ($C(CH_2OH)_4$) used in the present invention is used in order to allow it to act as a moisturizer, and use thereof in combination with trimethylglycine described above results in allowing them to act more synergistically than each using alone and provide the drawn lines with an excellent drying property and the ink with an excellent low temperature stability which have not so far been observed while preventing the pen tip from drying and allowing them to exert such the excellent performances as bringing about no feathering and no strike-through in the drawn lines.

A content of the above pentaerythritol is 0.5 to 8%, preferably 2 to 5% based on a whole amount of the ink composition.

If the above content is less than 0.5%, the drying inhibition effect of the pen tip is not sufficiently exerted, and a synergistic action thereof with trimethylglycine cannot be exerted. On the other hand, if it exceeds 8%, the effect of the synergistic action with trimethylglycine stays unchanged so much to bring about precipitation at low temperature and a reduction in the storage stability.

The water-soluble organic solvents used in the present invention include, for example, alcohols such as ethanol, isopropyl alcohol, n-butyl alcohol, ethylene glycol, diethylene glycol, and the like, amides such as formamide and derivatives thereof, sulfoxides such as dimethyl sulfoxide, ethers such as ethylene glycol monomethyl ether, ethylene glycol monobutyl ether, ethylene glycol dibutyl ether, diethylene glycol monomethyl ether, diethylene glycol monoethyl ether, diethylene glycol monobutyl ether, diethylene glycol diethyl ether, diethylene glycol dibutyl ether, propylene glycol methyl ether, dipropylene glycol methyl ether, tripropylene glycol methyl ether, propylene glycol butyl ether, dipropylene glycol n-butyl ether, tripropylene glycol n-butyl ether, propylene glycol phenyl ether, ethylene glycol monoethyl ether, ethylene glycol monohexyl ether, ethylene glycol monopheyl ether, ethylene glycol mono-2-ethylbutyl ether, propylene glycol ethyl ether, propylene glycol tertiary butyl ether, and the like. They can be used alone or in a mixture of two or more kinds thereof.

A content of the above water-soluble organic solvents is 10% or less, preferably 7% or less and more preferably 5% or less % or less based on a whole amount of the ink composition.

Such the performances as the excellent drying property of the drawn lines are exerted by controlling the content of the above water-soluble organic solvents to 10% or less.

The aqueous ink composition for a writing instrument according to the present invention is prepared by adding the respective components described above and in addition thereto, water (refined water, distilled water, ion-exchanged water, purified water and the like) as the balance (solvent). In addition to the respective components described above, optional components such as, for example, surfactants, preservatives or fungicides, pH controllers, water-soluble resins, resin emulsions and the like can suitably be contained as long as the effects of the present invention are not damaged.

Capable of being listed as the usable surfactants are, for example, nonionic surfactants such as sorbitan fatty acid esters, glycerin fatty acid esters, decaglycerin fatty acid esters, polyglycerin fatty acid esters, polyoxyethylene sorbitan fatty acid esters, polyoxyethylene sorbit fatty acid esters, polyoxyethylene glycerin fatty acid esters, polyethylene glycol fatty acid esters, polyoxyethylene alkyl ethers, polyoxyethylene polyoxypropylene alkyl ethers, polyoxyethylene alkylphenyl ethers, polyoxyethylene castor oil, polyoxyethylene lanolin•lanolin•alcohol•bees wax derivatives, polyoxyethylene alkylamine•fatty acid amides, and the like; anionic surfactants such as alkylsulfates, polyoxyethylene alkyl ether sulfates, N-acylamino acid salts, N-acylmethyltaurine salts, polyoxyethylene alkyl ether acetates, α-olefinsulfonates, alkylphosphates, polyoxyethylene alkyl ether phosphates, and the like; fluorine base surfactants such as perfluoroalkyl ethylene oxide adducts, perfluoroalkyl trimethylammonium salts, perfluoroalkyl carboxylates, fluorinated alkyl esters, perfluoroalkyl sulfonates, perfluoroalkyl group hydrophilic group-containing oligomers, perfluoroalkyl group hydrophilic group-containing urethanes, perfluoroalkyl phosphoric esters, perfluoroalkyl betaine, perfluoroalkyl amine oxide, perfluoroalkyl ammonium salts, perfluoroalkyl alkoxylates, perfluoroalkyl, perfluoroalkyl polyoxyethylene ethanol, and the like. The above surfactants can be used alone or in a mixture of two or more kinds thereof.

The preservatives or the fungicides include phenol, sodium omadine, sodium benzoate, benzimidazole base compounds and the like.

The pH controllers include hydroxides of alkali metals such as sodium hydroxide, potassium hydroxide, lithium hydroxide and the like, amine compounds such as triethanolamine, diethanolamine, monoethanolamine, dimethylethanolamine, morpholine, triethylamine and the like, ammonia, and the like.

The water-soluble resins include, for example, polyacrylic acid, water-soluble styrene-acryl resins, water-soluble styrene-maleic acid resins, water-soluble maleic acid resins, water-soluble styrene resins, polyvinylpyrrolidone, polyvinyl alcohol, water-soluble ester-acryl resins, ethylene-maleic acid copolymers, polyethylene oxide, water-soluble urethane resins, and the like.

The resin emulsions include, for example, acryl base emulsions, vinyl acetate base emulsions, urethane base emulsions, styrene-butadiene emulsions, styrene-acrylonitrile emulsions, and the like.

The above water-soluble resins and resin emulsions can be used alone or in a mixture of two or more kinds thereof.

The aqueous ink composition for a writing instrument according to the present invention can be loaded for use in various writing instruments such as ballpoint pens, marking pens, felt-tip pens and the like.

The structure of the marking pen shall not specifically be restricted and include, for example, marking pens of a free ink type or a sliver type in which a holder itself is used as an ink reservoir and in which the aqueous ink composition for a writing instrument having the composition described above is charged directly in the above holder or absorbed in an absorber received in the holder.

The aqueous ink composition for a writing instrument according to the present invention can be produced by employing methods which have so far been known, and it is obtained by adding at least a colorant, trimethylglycine, pentaerythritol, 10% by mass or less of a water-soluble organic solvent, and water, blending the prescribed amounts of the respective components in an aqueous solution and stirring and mixing the mixture by means of a stirrer such as a homomixer, a disper and the like. Further, coarse particles contained in the ink composition may be removed, if necessary, by filtration or centrifugal separation, and the ink composition may be produced while defoaming, heating or cooling.

The reasons why the aqueous ink composition for a writing instrument thus constituted according to the present invention is excellent in a drying property of the drawn lines and a low temperature stability of the ink while inhibiting the pen tip from drying and exerts the function of bringing about no feathering and no strike-through in the drawn lines can be estimated as follows.

That is, at least a colorant, trimethylglycine, pentaerythritol, 10% by mass or less of a water-soluble organic solvent, and water are contained in the aqueous ink composition for a writing instrument according to the present invention to thereby allow both of trimethylglycine and pentaerythritol to work as the components of inhibiting a drought resistance of the pen tip, and it is obvious that they act more synergistically by using them in combination in the aqueous ink composition for a writing instrument rather than using them alone respectively. The reasons thereof are not necessarily clarified, but the synergistic effect provides the drawn lines with an excellent drying property and the ink with an excellent low temperature stability while inhibiting the pen tip from drying and allows the drawn lines to exert such the excellent performances as bringing about no feathering and no strike-through.

The aqueous ink composition for a writing instrument according to the present invention is very excellent in a lasting effect for exerting the effects of the present invention, and the exertion period and the duration of the effects are prolonged. Further, trimethylglycine and pentaerythritol are water-soluble, and therefore the ink composition is excellent as well in an aging stability.

EXAMPLES

Next, the present invention shall be explained in further details with reference to examples and comparative examples, but the present invention shall not be restricted to the examples shown below.

Examples 1 to 7 and Comparative Examples 1 to 8

The respective aqueous ink compositions for a writing instrument were prepared by an ordinary method according to blend compositions shown in the following Table 1.

The respective ink compositions (whole amount: 100% by mass) for a writing instrument thus obtained were used to prepare marking pens of writing instruments by the following method, and a drought resistance (25° C./humidity 65%, 50° C./humidity 80%) of the pen tip and a drying property (writing paper, textbook), a feathering resistance, a strike-through property (writing paper, textbook) and a low temperature stability (−10° C.) of the drawn lines were evaluated by the respective evaluation methods shown below.

The blend compositions of the aqueous ink compositions prepared in Examples 1 to 7 and Comparative Examples 1 to 8 and the respective evaluation results thereof are shown in the following Table 1.

Preparation of Writing Instrument: Marking Pen:

A marking pen (trade name: PROPUS WINDOW PUS-102T, pen tip, thick: PE resin, fine: PET fiber, manufactured by Mitsubishi Pencil Co., Ltd.) was charged with the respective ink compositions prepared in Examples 1 to 7 and Comparative Examples 1 to 8 described above to prepare marking pens.

Evaluation Method of Drought Resistance of Pen Tip:

Marking pens (test samples, n=5, hereinafter the same shall apply) charged with the respective ink compositions prepared in Examples 1 to 7 and Comparative Examples 1 to 8 described above were used to evaluate the drought resistances of the pen tips, wherein the marking pens from which caps were detached were left alone as laid horizontally on the conditions of 25° C./humidity 65% and 50° C./humidity 80%, and they were used to write with a hand on a writing paper based on an ISO standard (14145-1) (hereinafter the same shall apply) every fixed time to evaluate the longest time (writable time) at which a writing state causing no marked feathering was obtained according to the following evaluation criteria.

Evaluation Criteria:
◉: 120 minutes or longer
○: 60 minutes or longer and shorter than 120 minutes
Δ: 45 minutes or longer and shorter than 60 minutes
X: shorter than 45 minutes Evaluation Method of Drying Property of Drawn Line:

The marking pens charged with the respective ink compositions prepared in Examples 1 to 7 and Comparative Examples 1 to 8 described above were used to draw lines having a length of about 25 cm with a hand on a writing paper and a paper for a textbook ("Shosetsu Nihonshi", Published in 2013 version, Yamakawa Printing Co., Ltd, ditto hereinafter). The drawn lines were rubbed lightly thereon with a finger covered with a finger sack (finger sack for office use, Mech 2, manufactured by Kokuyo Co., Ltd.) to a direction vertical to the drawn lines every fixed time to evaluate the shortest time (drying time of the drawn lines) at which the drawn lines were not rubbed off or stained according to the following evaluation criteria.

Evaluation Criteria:
◉: 3 seconds or shorter
○: 6 seconds or shorter
Δ: 10 seconds or shorter
X: 20 seconds or longer Evaluation Method of Feathering Resistance and Strike-through Property:

The marking pens charged with the respective ink compositions prepared in Examples 1 to 7 and Comparative Examples 1 to 8 described above were used to draw lines having a length of about 25 cm with a hand on a writing paper and a paper for a textbook to evaluate visually the feathering resistance and the strike-through property according to the following evaluation criteria.

Evaluation Criteria:
◉: feathering and strike-through are not observed at all
○: feathering is observed at an end part of writing
Δ: feathering and strike-through are observed at an end part of writing
X: feathering and strike-through are observed on drawn lines and at an end part of writing Evaluation Method for Low Temperature Stability:

Glass-made vial bottles charged with the respective ink compositions prepared in Examples 1 to 7 and Comparative Examples 1 to 8 described above were covered with caps and stored under the environment of −10° C. to evaluate a period in which the test sample could be used for writing and in which the ink in the vial bottle was not observed to be aggregated or frozen after fixed time passed (period in which a low temperature stability is maintained) according to the following evaluation criteria.

Evaluation Criteria:
◉: 3 months or longer
○: 1 month or longer and shorter than 3 months
Δ: 2 weeks or longer and shorter than 1 month
X: shorter than 2 weeks

TABLE 1

| | | | Example | | | | | | | Comparative Example |
|---|---|---|---|---|---|---|---|---|---|---|
| | | | 1 | 2 | 3 | 4 | 5 | 6 | 7 | 1 |
| Blend composition | Moisturizing agent | Trimethylglycine (glycine betaine) | 7.5 | 1.5 | 11.0 | 7.5 | 7.5 | 7.5 | 7.5 | 7.5 |
| | | Pentaerythrytol | 4.5 | 4.5 | 4.5 | 1.5 | 5.5 | 4.5 | | 4.5 |
| | | Inulin | | | | | | | | |
| | Colorant | NKW-4805 *1 | 40.0 | 40.0 | 40.0 | 40.0 | 40.0 | 40.0 | 40.0 | 40.0 |
| | Preservative | Bioace *2 | 0.3 | 0.3 | 0.3 | 0.3 | 0.3 | 0.3 | 0.3 | 0.3 |
| | pH controller | Triethanolamine | 1.0 | 1.0 | 1.0 | 1.0 | 1.0 | 1.0 | 1.0 | 1.0 |
| | Surfactant | Surflon S111N *3 | 0.2 | 0.2 | 0.2 | 0.2 | 0.2 | 0.2 | 0.2 | 0.2 |
| | Water-soluble organic solvent | Ethylene glycol | 3.0 | 3.0 | 3.0 | 3.0 | 3.0 | 7.0 | | 3.0 |
| | | Glycerin | | | | | | | 7.0 | |
| | Water (solvent) | Ion-exchanged water | 43.5 | 49.5 | 40.0 | 46.5 | 42.5 | 39.5 | 39.5 | 48.0 |
| Evaluation | Drought resistance of pen tip | 25° C./humidity 65% | ◉ | ○ | ◉ | ○ | ◉ | ◉ | ◉ | X |
| | | 50° C./humidity 80% | ◉ | ○ | ◉ | ○ | ◉ | ◉ | ◉ | ○ |
| | Drying property of drawn line | Writing paper | ◉ | ◉ | ◉ | ◉ | ◉ | ○ | ○ | ◉ |
| | | Text book | ◉ | ◉ | ◉ | ○ | ◉ | ◉ | ◉ | ◉ |
| | Feathering resistance/ strike-through | Writing paper | ◉ | ◉ | ◉ | ◉ | ◉ | ○ | ○ | ◉ |
| | | Text book | ◉ | ◉ | ◉ | ◉ | ◉ | ◉ | ◉ | ◉ |
| | Low temperature stability (−10° C.) | | ◉ | ◉ | ◉ | ◉ | ○ | ◉ | ◉ | ◉ |

| | | | Comparative Example | | | | | | |
|---|---|---|---|---|---|---|---|---|---|
| | | | 2 | 3 | 4 | 5 | 6 | 7 | 8 |
| Blend composition | Moisturizing agent | Trimethylglycine (glycine betaine) | 1.0 | 25.0 | | | | | |
| | | Pentaerythrytol | | | 4.5 | 4.5 | | | |
| | | Inulin | | | | | 7.5 | | |

TABLE 1-continued

| | | | | | | | | | |
|---|---|---|---|---|---|---|---|---|---|
| | Colorant | NKW-4805 *1 | 40.0 | 40.0 | 40.0 | 40.0 | 40.0 | 40.0 | 40.0 |
| | Preservative | Bioace *2 | 0.3 | 0.3 | 0.3 | 0.3 | 0.3 | 0.3 | 0.3 |
| | pH controller | Triethanolamine | 1.0 | 1.0 | 1.0 | 1.0 | 1.0 | 1.0 | 1.0 |
| | Surfactant | Surflon S111N *3 | 0.2 | 0.2 | 0.2 | 0.2 | 0.2 | 0.2 | 0.2 |
| | Water-soluble organic solvent | Ethylene glycol | 3.0 | 3.0 | 3.0 | 3.0 | 3.0 | 25.0 | |
| | | Glycerin | | | | | | | 25.0 |
| | Water (solvent) | Ion-exchanged water | 54.5 | 30.5 | 51.0 | 43.5 | 55.5 | 33.5 | 33.5 |
| Evaluation | Drought resistance of pen tip | 25° C./humidity 65% | Δ | ○ | ○ | Δ | X | ◎ | ◎ |
| | | 50° C./humidity 80% | X | ○ | Δ | X | X | ◎ | ◎ |
| | Drying property of drawn line | Writing paper | ◎ | ○ | ◎ | ◎ | ◎ | Δ | Δ |
| | | Text book | ◎ | X | ◎ | ○ | ◎ | X | X |
| | Feathering resistance/strike-through | Writing paper | ◎ | ◎ | ◎ | ◎ | ◎ | Δ | Δ |
| | | Text book | ◎ | ◎ | ◎ | ◎ | ◎ | ○ | ○ |
| | Low temperature stability (−10° C.) | | ○ | ◎ | X | X | X | ◎ | ◎ |

*1: manufactured by Nippon Fluorescent Chemical Co., Ltd.
*2: manufactured by K.I Chemical Industry Co., Ltd.
*3: manufactured by AGC Seimi Chemical Co., Ltd.

To discuss the results shown in Table 1, it has been found that the aqueous ink compositions for a writing instruments which are produced in Examples 1 to 7 falling in the scope of the present invention are excellent in a drought resistance of the pen tip, a drying property of the drawn lines and a low temperature stability of the ink and prevent the drawn lines from causing feathering and strike-through.

In contrast with this, it has been found that the aqueous ink compositions for a writing instrument which are produced in Comparative Examples 1 to 8 falling outside the scope of the present invention cannot exert the effects of the present invention.

In Comparative Examples 1 to 3, trimethylglycine was blended alone; in Comparative Example 4, pentaerythritol was blended alone; in Comparative Example 5, pentaerythritol was used in combination with trimethylglycine in place of Inulin which is a moisturizing agent; in Comparative Examples 6 to 8, both of trimethylglycine and pentaerythritol were not blended; and in Comparative Examples 7 and 8, an amount of the water-soluble organic solvent exceeded 10% by mass. In the above cases, the effects of the present invention cannot be exerted.

INDUSTRIAL APPLICABILITY

An aqueous ink compositions for a writing instrument which is suited to an aqueous marking pen is obtained.

What is claimed is:

1. An aqueous ink composition for a writing instrument containing at least a colorant, 1.5 to 11% by mass of trimethylglycine, 1.5 to 5.5% by mass of pentaerythritol, 10% by mass or less of a water-soluble organic solvent, based on a total amount of the ink composition, and water.

2. A writing instrument charged with the aqueous ink composition for a writing instrument as described in claim 1.

* * * * *